(12) United States Patent
Bardouillet

(10) Patent No.: US 6,288,630 B1
(45) Date of Patent: Sep. 11, 2001

(54) TRANSMISSION OF AN OPERATING ORDER VIA AN A.C. SUPPLY LINE

(75) Inventor: Michel Bardouillet, Rousset (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/295,145

(22) Filed: Apr. 20, 1999

(30) Foreign Application Priority Data

Apr. 20, 1998 (FR) .................................................... 98 05200

(51) Int. Cl.$^7$ .................................................... H04M 11/04
(52) U.S. Cl. ........................ 340/310.01; 340/310.06; 315/194; 315/DIG. 4
(58) Field of Search ......................... 340/310.01, 310.02, 340/310.04, 310.06, 310.08; 315/194, 291, 293, 307, DIG. 4

(56) References Cited

U.S. PATENT DOCUMENTS

| 4,328,482 | 5/1982 | Belcher et al. | 340/310.6 |
| 4,644,320 | 2/1987 | Carr et al. | 340/310.2 |
| 4,868,539 | 9/1989 | Foord | 340/310.6 |
| 5,691,605 | * 11/1997 | Xia et al. | 315/307 |
| 5,872,429 | * 2/1999 | Xia et al. | 315/194 |
| 5,999,849 | * 12/1999 | Cord et al. | 607/2 |

* cited by examiner

*Primary Examiner*—Van T. Trieu
(74) *Attorney, Agent, or Firm*—Theodore E. Galanthay; David V. Carlson; SEED Intellectual Property Law Group PLLC

(57) ABSTRACT

The present invention relates to a circuit for supplying a load from an approximately D.C. voltage obtained by rectifying an A.C. voltage, including means for extracting from the rectified A.C. voltage an information depending on a phase angle variation of the A.C. voltage, and a means for making the approximately D.C. load supply voltage independent from the phase angle variation of the A.C. voltage.

14 Claims, 6 Drawing Sheets

TRANSMISSION OF AN OPERATING ORDER VIA AN A.C. SUPPLY LINE

TECHNICAL FIELD

The present invention relates to the transmission of an information over an A.C. supply line of a load with a capacitive input impedance. The present invention relates, more specifically, to the transmission of an operating control signal for a circuit meant to supply a load from an approximately D.C. voltage obtained by rectifying an A.C. voltage.

BACKGROUND OF THE INVENTION

FIG. 1 very schematically shows the electric connection of a system 1 of supply of a load 2 (Q) from an A.C. voltage Vin, provided with a bridge 5 for rectifying voltage Vin and with a circuit 4 of supply of load 2 from an approximately D.C. voltage Vout. Voltage Vout is taken across a capacitor C receiving a rectified A.C. output voltage of bridge 5.

Input voltage Vin of system 1 is an A.C. voltage coming, for example, from a variator 3 of an A.C. supply voltage Vac, for example, the mains voltage.

When it is desired to vary the supply power of a load having a resistive input impedance, a phase angle or phase angle switching variator is generally used to modulate the power transmitted to load 2.

Although such a phase angle variator is well adapted to applications for which load 2 is of resistive type and does not require a supply from a recovery of a D.C. voltage, conversely to what is shown in FIG. 1, such a phase angle variator raises several problems in the case of a capacitive input impedance load.

A first problem is that, for the phase angle variation to translate as a power variation of load 2, the approximately D.C. voltage Vout has to follow the power variations linked to the phase angle variation. As a result, circuit 4 used to supply load 2 sees its own supply vary, which can cause malfunctions due to the supply needs of the components of circuit 4. For example, if circuit 4 forms a switched-mode converter used to supply a load 2 formed of a fluorescent lamp, a variation of voltage Vout adversely affects the proper operation of the switched-mode converter.

Further, a switching in the charge area of a capacitor constitutive of the input impedance results in a significant effective current, which is not desirable.

Accordingly, for loads having a capacitive input impedance, other means than the phase angle variation are conventionally used to act upon the operation of system 1.

In a conventional circuit 4 such as shown in FIG. 1, the power variation function is generally performed from an analog low voltage input E of circuit 4. The signal applied to terminal E is used, for example in an application to a fluorescent lamp, to modify the frequency of the alternating current provided by the switched-mode converter to vary the light intensity. Terminal E of light intensity dimming control is meant to be controlled by an external variator 3 setting a control voltage generally included between 0 and 5 volts and proportional to the desired light intensity.

A major disadvantage of this variation solution is the need for a low voltage link between system 1 of control of load 2 (here, a fluorescent lamp) and a generally remote mechanical potentiometer-switch (variator 3). As illustrated in FIG. 1, in addition to the two conductors 8, 9 (phase and neutral) of A.C. supply Vin, two low voltage conductors (dotted lines 7) indeed have to be provided between a switch 3 including a dimmer and electronic system 1 of control of load 2.

Another conventional solution to transmit a light intensity order to a load supply control circuit 4 consists of performing a modulation of the carrier current, that is, modulating the alternating supply current with a high frequency signal transmitting the light intensity order. Such a solution requires, on the side of dimmer 3, a carrier current modulation system (not shown) to transmit the order and, on the side of system 1, a demodulator (not shown) for extracting the power order from the A.C. supply.

Such a solution has the advantage of avoiding the need for an additional link 7. However, it has the disadvantage of being particularly complex and expensive to implement.

SUMMARY OF THE INVENTION

The present invention aims at providing a novel solution to transmit an order to a load supply circuit.

The present invention aims, in particular, at providing a simple solution which requires no additional link between the control element and the load supply circuit.

The present invention aims, in particular, at providing a system of acquisition of an order, coming from a variation by phase angle switching of an A.C. supply voltage, within a circuit of load supply from an approximately D.C. voltage obtained by rectifying this A.C. voltage.

More generally, the present invention aims at providing a transmission system which enables transmitting any analog order by using the A.C. supply voltage as a transmission support and without requiring to use a high frequency modulation transmission-reception system.

To achieve these objects, the present invention provides a circuit for supplying a load from an approximately D.C. voltage obtained by rectifying an A.C. voltage, including means for extracting from the rectified A.C. voltage information depending on a phase angle variation of the A.C. voltage, and means for making the approximately D.C. load supply voltage independent from the phase angle variation of the A.C. voltage.

According to an embodiment of the present invention, the rectified A.C. voltage is provided between two respectively positive and negative terminals, the circuit including, between the positive terminal and a first terminal of a capacitor across which the approximately D.C. supply voltage of the load is taken, a one-way conduction element, and between the positive and negative terminals, a voltage dividing bridge providing a low voltage proportional to the rectified voltage.

According to an embodiment of the present invention, the circuit includes a means of integration of the rectified low voltage to provide an analog low voltage depending on the phase angle of the A.C. voltage.

According to an embodiment of the present invention, the phase angle variation of the A.C. voltage is performed over at most one half-halfwave and outside charge periods of the capacitor.

According to an embodiment of the present invention, the information is an operating order for an energy converter means to control the load.

According to an embodiment of the present invention, the phase angle variation of the A.C. voltage is performed between 50 and 100% by means of a variator by phase angle cut-off.

According to an embodiment of the present invention, the load is a fluorescent lamp.

The present invention further provides a method of transmission of information over an A.C. supply line of a supply circuit of a load having a capacitive input impedance including a capacitor adapted to providing an approximately D.C. voltage, this method consisting, on the transmitter side, of varying the phase angle of the A.C. voltage over at most one half-halfwave and outside charge periods of the capacitor, and on the receiver side, of isolating the information relative to the phase angle upstream of the capacitor.

The foregoing objects, features and advantages of the present invention, will be discussed in detail in the following non-limiting description of specific embodiments in connection with the accompanying drawings.

DETAILED DESCRIPTION OF THE INVENTION

Figure 1:
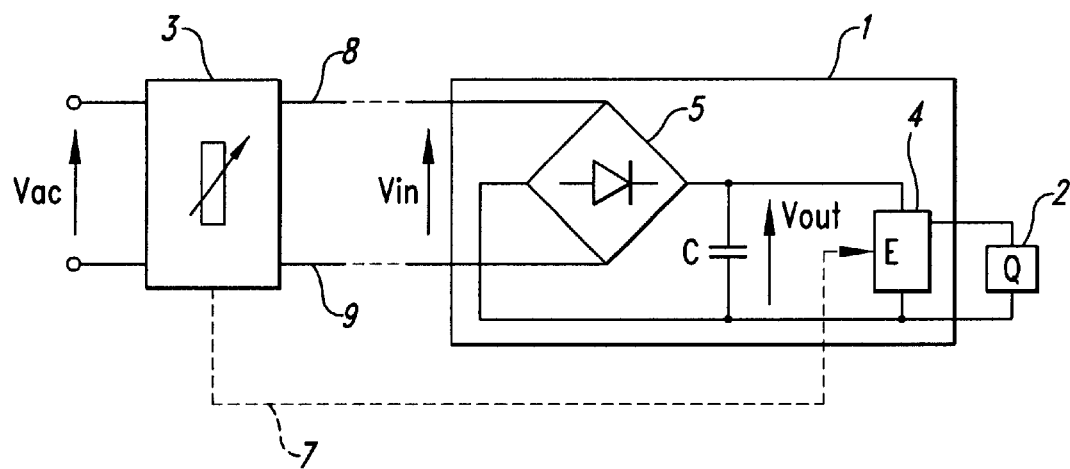
FIG. 1, previously described, is meant to show the state of the art and the problem to solve.

The same elements have been referred to with the same references in the different drawings. For clarity, only those elements necessary to the understanding of the present invention have been shown in the drawings and will be described hereafter.

A characteristic of the present invention is to use a phase angle variation of the A.C. supply voltage to transmit analog information to a circuit supplying a load from an approximately D.C. voltage obtained by rectifying the A.C. voltage, without modifying the approximately D.C. voltage used by the load supply circuit.

Figure 2:
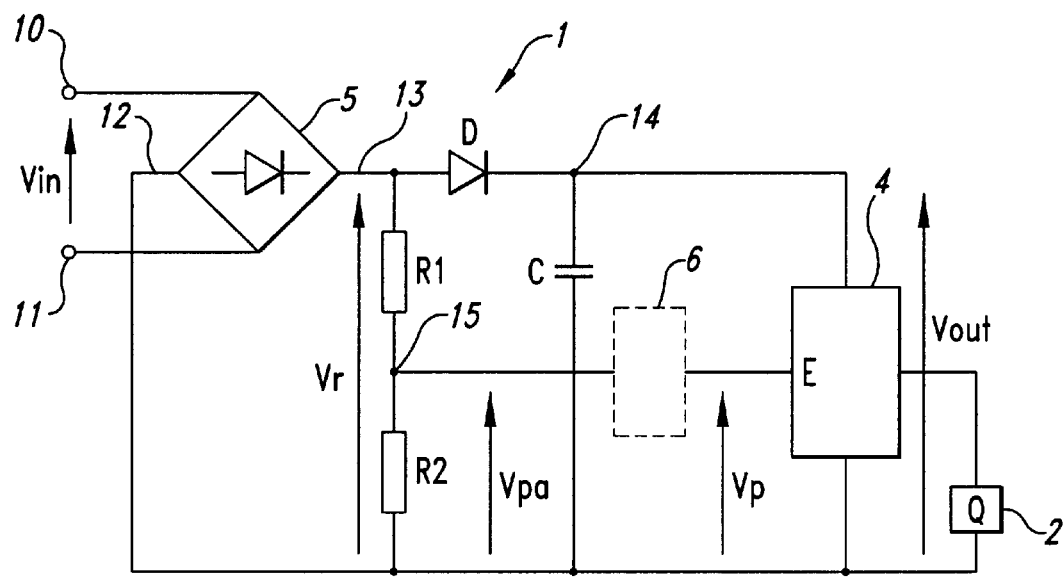
FIG. 2 shows an embodiment of a circuit of load supply from an approximately D.C. voltage obtained by rectifying an A.C. voltage according to the present invention.

FIG. 2 shows an embodiment of a circuit 1' of supply of a load having a capacitive input impedance according to the present invention.

This circuit conventionally includes a diode bridge 5, two input terminals of which are connected to two terminals 10, 11 of application of an A.C. voltage Vin.

According to the present invention, A.C. voltage Vin corresponds to an A.C. supply voltage, for example, mains voltage Vac, to which a phase angle switching is applied.

A first rectified output terminal 12 of bridge 5 forms a ground terminal of circuit 1'. A second rectified output terminal 13 of bridge 5 has, as in a conventional circuit, the object of providing by means of a capacitor C an approximately D.C. voltage Vout to a circuit 4 used to supply a load 2.

According to the present invention, output voltage Vr of bridge 5, taken between terminals 13 and 12, is applied to two ends of a voltage dividing bridge formed of two resistors R1, R2, associated in series. According to the present invention, this dividing bridge is meant to extract from the rectified A.C. voltage a low voltage Vpa depending on the phase angle of voltage Vin.

Another characteristic of the present invention is to provide a diode D in series with capacitor C between rectified output terminals 13 and 12, the anode of the diode being connected to terminal 13 and approximately D.C. voltage Vout remaining taken across terminals 14, 12 of capacitor C.

The function of diode D, or of an analogous one-way conduction element, is to allow rectified output voltage Vr to be taken before its filtering by capacitor C. This is, according to the present invention, indispensable to extract from A.C. supply voltage Vin the analog information carried by the phase angle variation of this A.C. voltage.

The sizing of resistive dividing bridge R1–R2 depends on the amplitude of the A.C. supply voltage Vac and on the amplitude desired for analog low voltage Vpa representing the low voltage information extracted from the A.C. supply and meant for load supply circuit 4 in the form of an analog order voltage Vp.

Preferably, an integrator circuit 6 (in dotted lines in FIG. 2) is interposed between midpoint 15 of resistive dividing bridge R1–R2 and terminal E of circuit 4 receiving the control voltage. The function of this integrator is, as will be seen hereafter in relation with FIG. 4, to convert the angle variations of the rectified A.C. voltage Vr into D.C. voltage levels.

It should be noted that any other equivalent voltage step-down means may be used instead of resistive dividing bridge R1, R2. However, the use of resistors is a preferred embodiment of the present invention due to its simplicity.

Similarly, any other one-way conduction means may be used instead of diode D which however forms a preferred embodiment on account of its simplicity.

According to the present invention, the approximately D.C. voltage Vout across capacitor C is not disturbed by the phase angle variation of the A.C. supply voltage. This characteristic is respected provided that it is ascertained, on the variator side (not shown in FIG. 2), that the variation range of the phase angle excludes the ranges of recharge of capacitor C. This characteristic of the present invention will be better understood hereafter in relation with the discussion of FIGS. 4 and 7.

Figure 3:
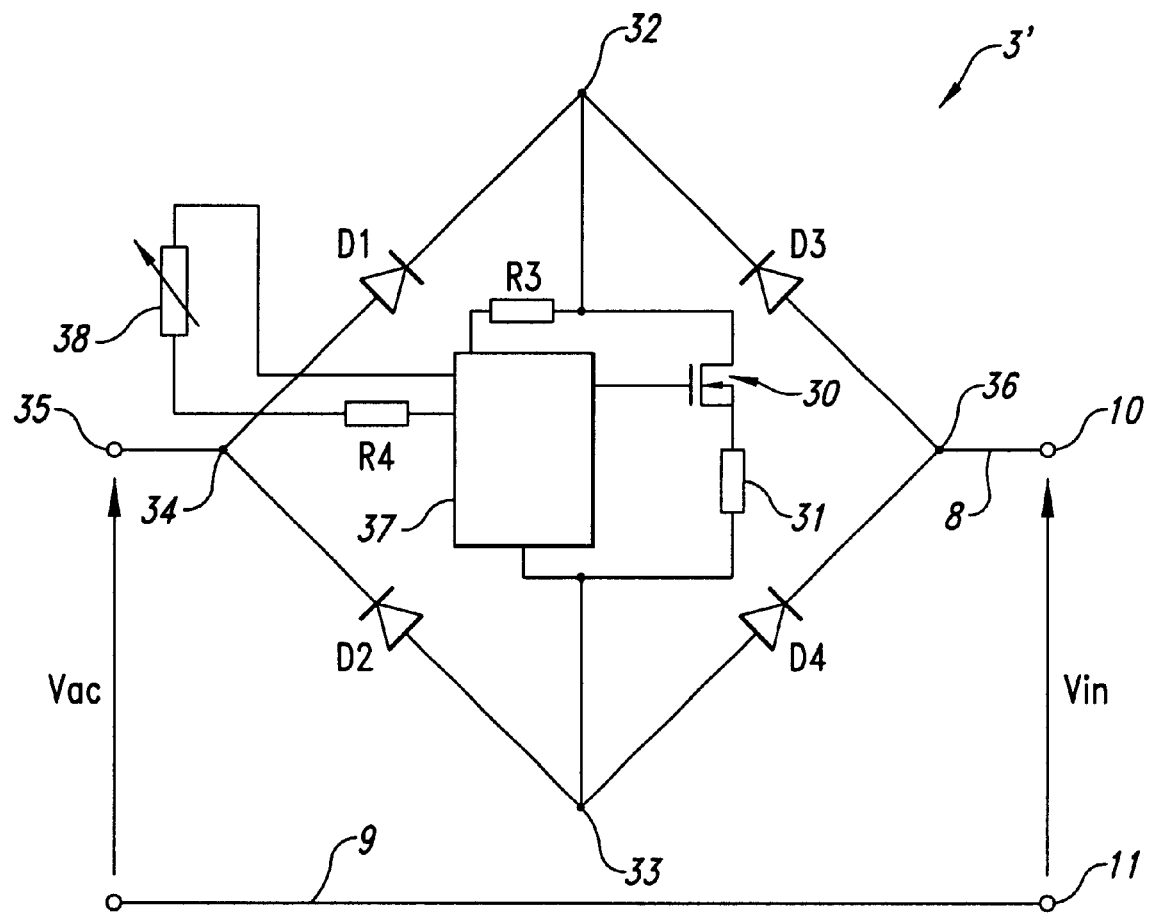
FIG. 3 shows a first embodiment of a means of transmission of an analog order according to the present invention.

FIG. 3 shows an example of a phase angle switching variator 3' to which the present invention applies. Variator 3' is based on the use of a switch 30 (here, a MOS transistor) connected in series with a measurement resistor 31 between two rectified output terminals 32 and 33 of a diode bridge D1, D2, D3, D4. A first A.C. terminal 34 of the bridge is connected to a terminal 35 (for example, the phase) of mains Vac, while a second A.C. terminal 36 of the bridge here is an output terminal (phase 8) of the modified A.C. supply Vin, meant to be connected to input terminal 10 (FIG. 2) of circuit 1'. The other line (neutral 9) of the A.C. supply here is uninterrupted. Transistor 30 is controlled by a converter 37 (for example, a circuit TS555 sold by SGS-Thomson Microelectronics Company) connected between terminal 33 and, via a supply resistor R3, terminal 32.

The general operation of a variator of the type shown in FIG. 3 is well known. Use of the invention improves operation, as described herein. Circuit 37 receives a setting control signal, for example, for a potentiometer 38 mounted according to the present invention in series with a resistor R4. The function of resistor R4 is to limit the variation range of the setting order of circuit 37 and, accordingly, the variation range of the phase angle of the provided voltage Vin. This resistor R4 may be replaced with a limitation of the excursion of potentiometer 38.

The variator shown in FIG. 3 is an example of variator based on a phase switching by a turn-off switch which is a preferred solution of the variator of the present invention.

According to this embodiment of a cut-off phase angle switching variator, a characteristic of the present invention is to limit the variation range of the phase angle of the provided voltage Vin between 50 and 100%.

Figure 4A:
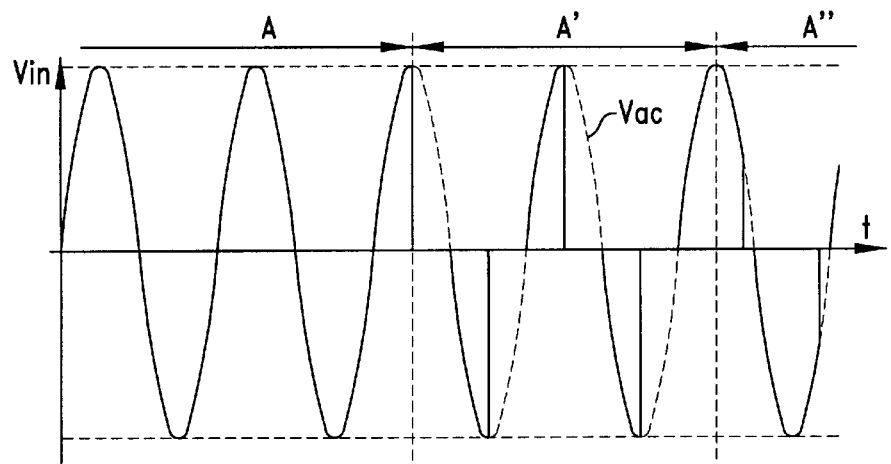
FIGS. 4A to 4F illustrate, in the form of timing diagrams, the operation of the circuit of FIG. 2 by using a transmission means such as shown in FIG. 3.
Figure 4B:
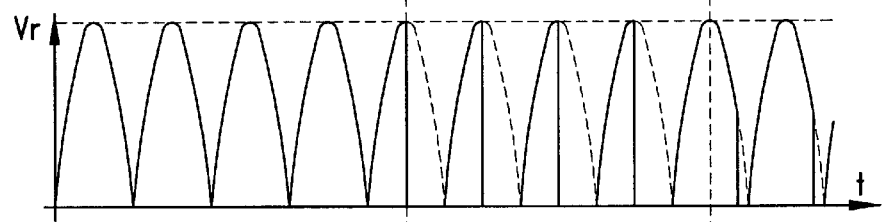
Figure 4C:
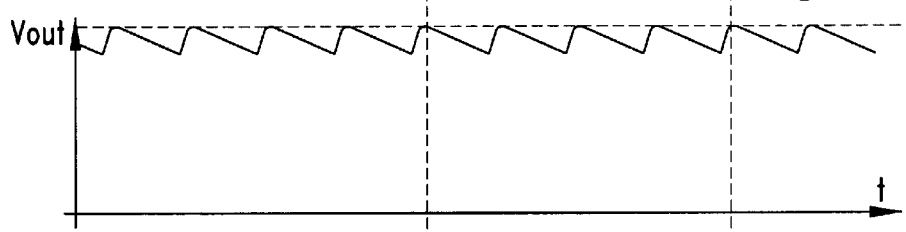
Figure 4D:
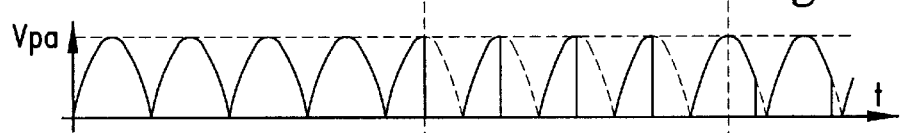
Figure 4E:
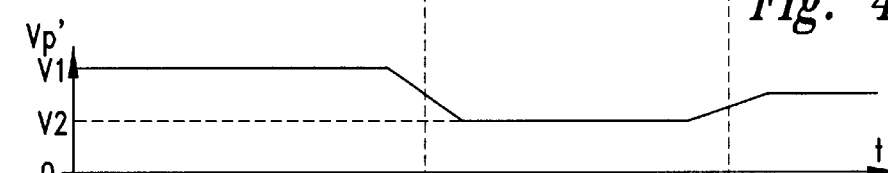
Figure 4F:
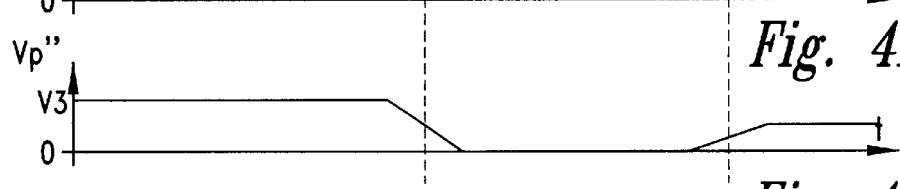

This characteristic of the present invention is illustrated by FIGS. 4A to 4F which show, in the form of timing diagrams, an example of waveforms of different voltage characteristics of the circuit of the present invention. FIG. 4A shows voltage Vin. FIG. 4B shows voltage Vr at the output of bridge 5 (FIG. 2). FIG. 4C shows the shape of voltage Vout across capacitor C. FIG. 4D shows the shape of voltage Vpa across resistor R2. FIGS. 4E and 4F show, respectively according to two distinct embodiments of integrator circuit 6, the shape of control voltages Vp' and Vp" meant to be applied to input E of load supply circuit 4.

In the example shown in FIGS. 4, three desired control signal levels set by variator 3' of FIG. 3 are successively assumed. For example, these three control signals correspond to three light intensity levels desired for a fluorescent lamp as will be seen in relation with the example of application of FIG. 8. In a first phase A, the phase angle imposed by variator 3' is maximum, that is, voltage Vin corresponds to voltage Vac. In this case, voltage Vr at the output of bridge 5 (FIG. 2) includes full halfwaves, as well as voltage Vpa across resistor R2. In a second phase A', it is assumed that variator 3' is set to provide a voltage Vin having a phase angle of 50%. As a result, voltages Vr and Vpa also exhibit, at each rectified halfwave, a 50% phase angle. In a third operating phase A", an intermediary phase angle position between 50 and 100% has been chosen.

As can be seen in FIG. 4C, the provision of a turning-off of switch 30 only between 50 and 100% of the phase angle enables preserving a voltage Vout which is not affected by the phase angle variations which occur during capacitor discharge periods. Accordingly, the transmission of the control signal to circuit 4 does not affect its supply. This is due, in particular, to the presence of diode D between points 13 and 14.

As can be seen in FIG. 4D, the mean value of low voltage Vpa is different according to phase A, A', or A". This mean value is maximum in phase A, minimum in phase A', and intermediary in phase A". Accordingly, by integrating the signal present on terminal 15 (voltage Vpa), a voltage level Vp which depends on the phase angle chosen for voltage Vin may be recovered.

Figure 5A:
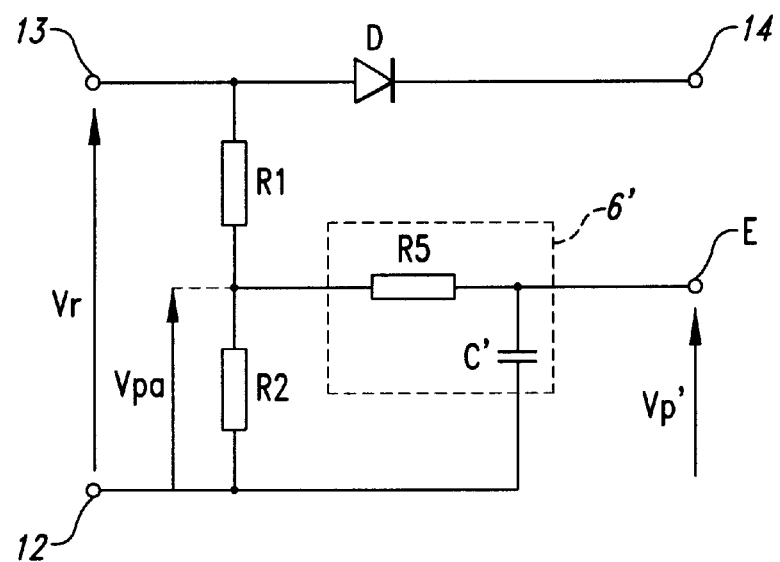
FIG. 5A shows a first embodiment of a means of integration of the circuit of FIG. 2.

According to a first embodiment of the integrated circuit illustrated in FIG. 5A, control voltage Vp' (FIG. 4E) varies between two extreme levels V1 and V2, both positive. Integrator circuit 6' is in this case formed of a resistor R5 associated in series with a capacitor C'. This series association is connected in parallel to resistor R2 and order voltage Vp' is taken across capacitor C'.

Figure 5B:
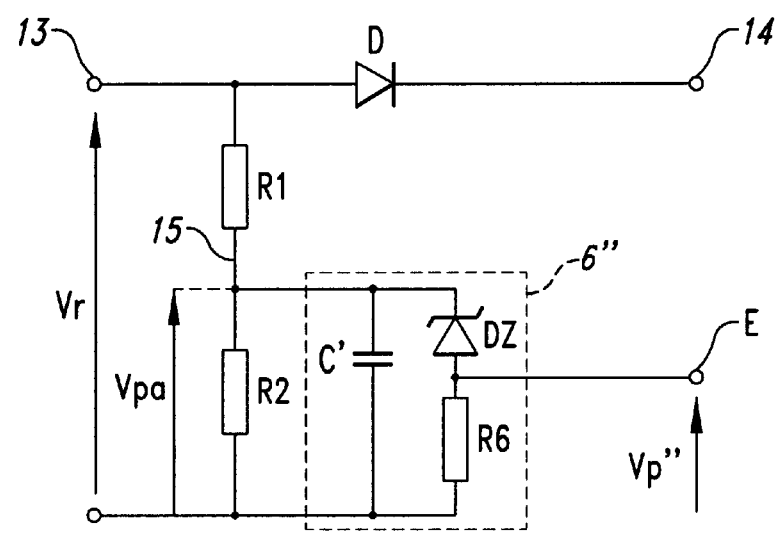
FIG. 5B shows a second embodiment of the integration means of the circuit of FIG. 2.

In a second embodiment where the excursion of voltage Vp is desired to be brought back between 0 volt and a positive level, an integration circuit 6" such as shown in FIG. 5B is used. In this embodiment, a capacitor C' is connected in parallel on resistor R2. A Zener diode DZ associated in series with a resistor R6 is connected in parallel on capacitor C'. Order voltage Vp" is taken across resistor R6. In such an embodiment, voltage Vp" varies between 0 volt and a value V3 corresponding to voltage Vpa minus the avalanche voltage of the Zener diode. This operating mode is illustrated by FIG. 4F.

It should be noted that in the embodiment of FIG. 5B, the integration resistor function is assumed by resistor R1. A resistor may however be used, as an alternative, between point 15 and the first terminal of capacitor C'. Similarly, in the embodiment illustrated by FIG. 5A, resistor R5 is optional and the integration resistor function may also be assumed by resistor R1.

The time intervals required for the level switching of voltage Vp' or Vp" of course depend on the integration constant, that is, on the time constant introduced by capacitor C' and resistor R5 (FIG. 5A) or by capacitor C' and resistor R1 (FIG. 5B).

As a specific example of embodiment, to obtain a variation of the order voltage of a 5-volt amplitude from a phase angle variation included between 50 and 100% of a 220-volt A.C. supply voltage, a resistor R1 of a value of 100 kilo-ohms and a resistor R2 of a value of 3.3 kilo-ohms will be provided. In the embodiment of the integration circuit shown in FIG. 5A, a resistor R5 of 100 kilo-ohms and a capacitor C' of 1 microfarad may for example be provided. In this case, potentials V1 and V2 of voltage Vp' respectively have as values 10 and 5 volts. It is assumed, to achieve this that voltage Vpa has a maximum 14.14-volt amplitude.

In the case of the embodiment illustrated by FIG. 5B, a 5-volt value may be chosen for Zener diode DZ and a 10 kilo-ohm value may be chosen for resistor R6. A voltage Vp" which varies between 0 and 5 volts is then obtained.

Figure 6:
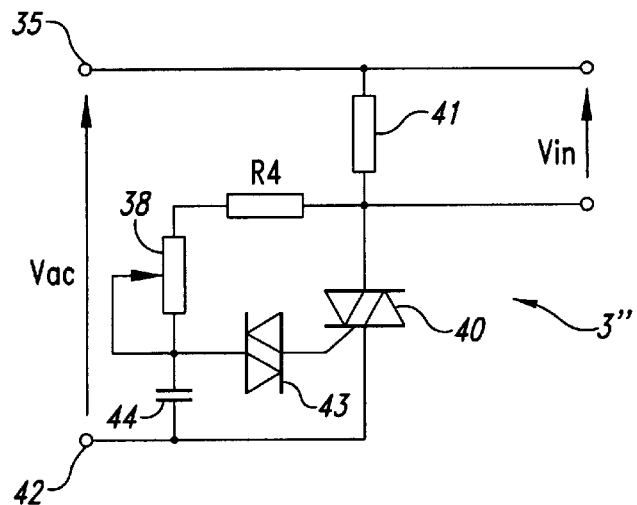
FIG. 6 shows a second embodiment of a means of transmission of an analog order according to the present invention.

FIG. 6 shows a second embodiment of a phase angle switching variator which may be used with a circuit 1' according to the present invention such as shown in FIG. 2. Variator 3" shown in FIG. 6 is made from a triac 40 mounted in series with a resistor 41 between terminals 35 and 42 of application of A.C. supply voltage Vac. The gate of triac 40 is connected via a diac 43 to the midpoint of a series association of a capacitor 44 and of a potentiometer 38 (if necessary associated with a limiting resistor R4) connected in parallel with triac 40.

The general operation of a triac variator of the type shown in FIG. 6 is well known. Use of the invention improves operation, as explained herein. When at the beginning of a halfwave, triac 40 is not triggered. The triggering of triac 40 only occurs at the time when cell RC (formed of capacitor 44, of resistor R4 and of potentiometer 38) generates across terminal C a voltage sufficient to trigger the triac The triggering voltage of a triac generally is of some thirty volts and corresponds to the threshold voltage of diac 43. The triac then conducts in avalanche.

By modifying the resistance of potentiometer 38, the triggering delay of triac 40 is varied with respect to the beginning of the halfwave, and thus to the phase angle. The triac once triggered turns off at the zero crossing of the halfwave. A variator such as illustrated in FIG. 6 generally is called a phase angle turn-on variator.

Figure 7A:
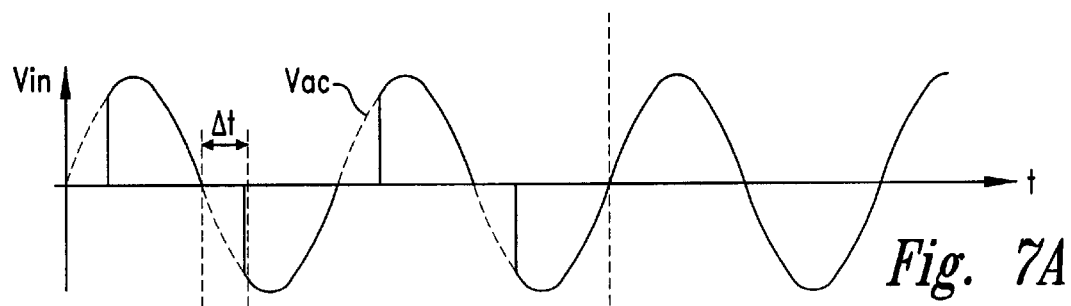
FIGS. 7A to 7C illustrate, in the form of timing diagrams, the operation of the circuit of FIG. 2 by using a transmission means such as shown in FIG. 6.
Figure 7B:
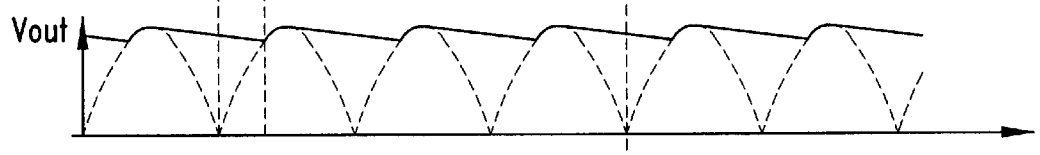
Figure 7C:
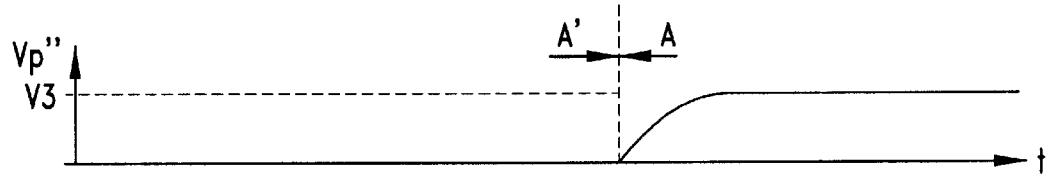

FIGS. 7A to 7C illustrate in the form of timing diagrams the operation of a supply circuit according to the present invention when controlled by a variator of the turn-on type. FIG. 7A shows the shape of voltage Vin. FIG. 7B illustrates the shape of voltage Vout and FIG. 7C illustrates the shape of control voltage Vp". It is assumed, for the representation of FIGS. 7A to 7C, that the integrating circuit of the system according to the present invention is provided with a Zener diode as shown in FIG. 5B.

Symmetrically to what has been discussed in relation with FIGS. 4A to 4F, a variation of the phase angle by means of triac 40 causes a linear variation of the level of voltage Vp". In the example of FIGS. 7A to 7C, a first operating phase A' has been shown in which potentiometer 38 is set for the phase angle to correspond to the minimum level of voltage Vp", that is, the Zener diode of the integrator is in avalanche. In a second operating phase A, potentiometer 38 is set so that the phase angle is maximum and voltage Vp" reaches level V3.

It should be noted that in the practical case of a triac, the phase angle can never be null. In FIG. 7A, the triac has been assumed to be perfect for example purposes only, that is, capable of turning on at the zero crossing of the halfwave, even though such performance will usually not be obtained from a triac.

In an embodiment with a turn-on variator, attention will be paid to size the variator and the circuit of the present invention so that the phase angle, or the variation time interval At introduced by variator 3", remains lower than the duration separating the beginning of the halfwave from the conduction beginning of rectifying bridge 5 used to supply the load. Indeed, in the opposite case, the level of voltage Vout (FIG. 7B) could no longer be maintained constant. Accordingly, the phase angle variation range is, according to this embodiment, chosen to guarantee that capacitor C, across which output voltage Vout is taken, can charge properly at each halfwave.

As a specific example of embodiment, for a triac variator, a phase angle variation range between a few percents (0%, assuming a perfect turn-on switch) and approximately 30% may be provided.

It should be noted that the solution of a variator based on a phase angle switching by a turn-off switch (FIG. 3) is a preferred solution with respect to a variator based on a phase switching by a turn-on switch (FIG. 6). In addition to the advantage of enabling a wider phase angle variation range (from 50 to 100% instead of from 0 to 30%), the solution based on a phase switching by a turn-on switch has the advantage of having an operation independent from the application. Indeed, capacitor C never charges during a halfwave decrease and this decrease thus is available to transmit the information to the load supply circuit.

Figure 8:
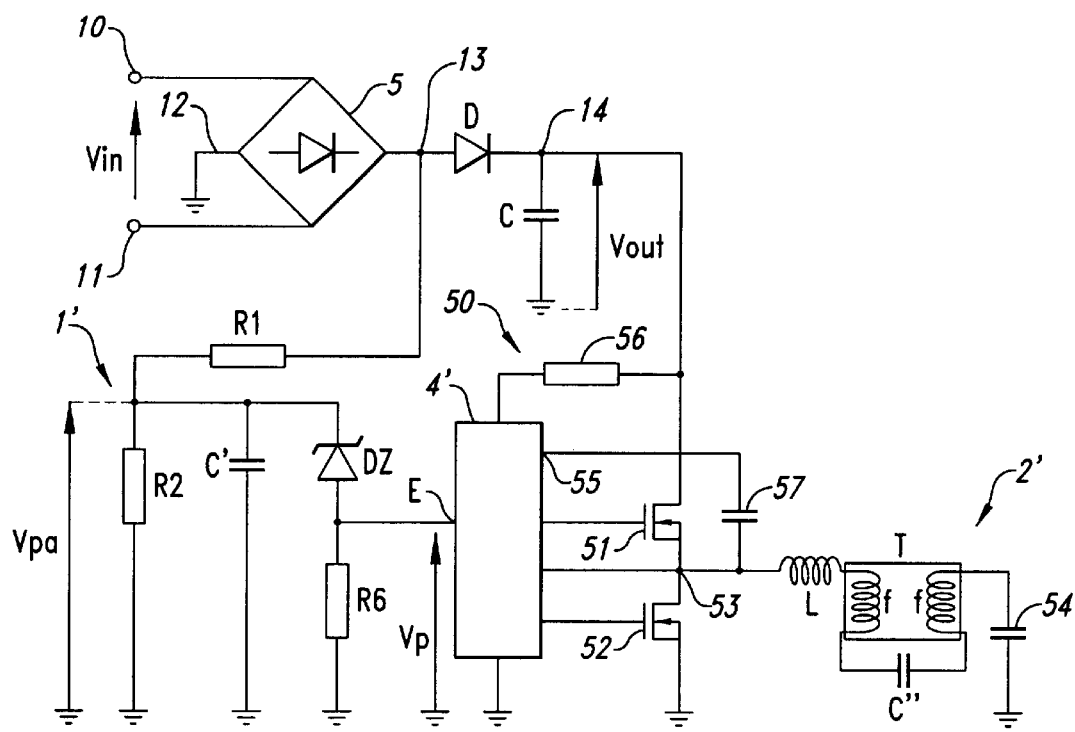
FIG. 8 illustrates a first example of application of the present invention to a light dimming of a fluorescent lamp.

FIG. 8 shows an example of diagram of application of the present invention to a control circuit of a fluorescent lamp T.

Bridge 5 and capacitor C provide, for example, for an A.C. voltage Vin of 220 volts, a D.C. supply of 300 volts to a switched-mode converter 50 which is of "symmetrical half-bridge" type. This converter provides an alternating current at a frequency generally on the order of 30 kHz to fluorescent lamp T via a high frequency inductance L.

Converter 50 generally is formed of a control circuit 4' associated with two switches 51, 52 (for example, two power MOS transistors) connected in series between terminal 14 and the ground, capacitor C being connected in parallel to this series association. The midpoint of the series association of transistors 51 and 52 forms an output terminal 53 of switched-mode converter 50, connected to a first terminal of high frequency inductance L mounted in series with a first filament f of lamp T. A capacitor C" of low value connects the first filament f to a second filament f' of lamp T and participates in the triggering of said lamp. The free terminal of filament f' is grounded via a capacitor 54 of filtering of the D.C. component in lamp T.

Switches 51 and 52 are controlled by circuit 4'. Terminal 53 forms a floating reference terminal for switch 51. Circuit 4' is supplied from terminal 14 via a resistor 56. A charge pump capacitor 57 connects terminal 53 to a terminal 55 of circuit 4' corresponding to the supply of a control amplifier of switch 51.

Circuit 4' may include other terminals of configuration and parametering not shown.

The general operation of a control circuit such as shown in FIG. 8 is well known as concerns the control of lamp T. Use of the invention improves operations as explained herein. As a specific example, circuit 4' may be an integrated circuit known under trade name L6574 and manufactured by SGS-Thomson Microelectronics.

In such a circuit, the light dimming function of the lamp is performed from a low voltage analog input E receiving an control voltage Vp according to the present invention.

The use of a circuit 1' according to the present invention of extraction of a power control signal from A.C. voltage Vin, without modifying the charge of capacitor C providing voltage Vout meant for circuit 4' and for the lamp, has many advantages.

First, it is now possible to have a light dimming function without requiring two additional low voltage wires between a switch and the lamp. According to the present invention, this light intensity order transmission is performed by means of the supply itself. In this respect, it should be noted that the present invention requires no complex high frequency transmission-reception system and enables using conventional variators such as illustrated, for example, in FIGS. 3 and 6.

Further, the reduced bulk of the components of circuit 1' according to the present invention with respect to conventional devices enables considering their integration in the cap of a fluorescent lamp, for example, of CFL type.

Moreover, using a variator of turn-off switch type, that is, using the phase angle included between 50 and 100% of the halfwave, provides a versatile product, be it on the variator side or on the load side.

Figure 9:
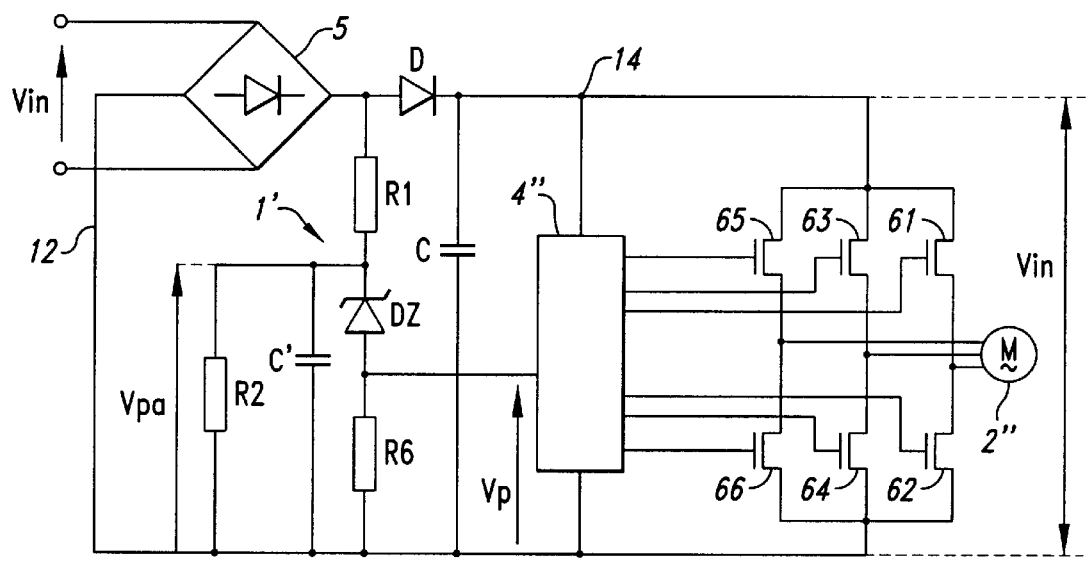
FIG. 9 illustrates a second example of application of the present invention to motor rotation speed control.

FIG. 9 very schematically shows a second example of application of a supply circuit according to the present invention. This example applies to the control of a motor 2" from a three-phase control circuit 4". Such a control circuit controls the respective off and on periods of six switches (for example, MOS transistors) 61, 62, 63, 64, 65, and 66 coupled two by two in parallel between terminals 14 and 12 of a rectified supply system such as illustrated in relation with FIG. 2. Circuit 4" receives a low voltage order Vp forming, in this application, a speed order for motor 2". This speed control signal can thus, according to the present invention, be transmitted in a very simple way from a distant control element including a phase angle switching variator, without adversely affecting the actual power supply of the motor via capacitor C providing a D.C. supply between terminals 14 and 12.

The general operation of a motor control system such as illustrated by FIG. 9 is conventional and is not the object of the present invention. Use of the invention improves operation, as explained herein. It should be noted that what has been schematized by a control circuit 4" generally is in practice realized by means of several associated integrated circuits.

In the examples of application of FIGS. 8 and 9, it has been arbitrarily assumed that control voltages Vp require referencing to the ground and the respective circuits 1' of extraction of these orders Vp are provided with an integration circuit such as illustrated in relation with FIG. 5B.

Of course, the present invention is likely to have various alterations, modifications, and improvements which will readily occur to those skilled in the art. In particular, the sizing of the different components of the system according to the present invention will be adapted according to the application and, in particular, according to the desired supply voltage and excursion range for the low order voltage. Further, other variators than those taken as an example may be used provided that they respect the described functionalities. Moreover, the present invention applies to any circuit of load supply from an approximately D.C. voltage coming from an A.C. voltage.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for supplying a load from an approximately D.C. voltage obtained by rectifying an A.C. voltage, comprising:

means for producing a phase angle variation in an A.C. supply voltage which varies during a time from zero to one half of a half-wave;

means for extracting from the rectified A.C. voltage information depending on the phase angle variation of the A.C. voltage;

a capacitor circuit means for charging during periods when the phase angle is not varying; and means for making the approximately D.C. load supply voltage independent from the phase angle variation of the A.C. voltage.

2. The circuit of claim 1, wherein the rectified A.C. voltage is provided between two respectively positive and negative terminals, including:

between the positive terminal and a first terminal of the capacitor across which the approximately D.C. supply voltage of the load is taken, a one-way conduction element; and between the positive and negative terminals, a voltage dividing bridge providing a low voltage proportional to the rectified voltage.

3. The circuit of claim 2, including a means of integration of the rectified low voltage to provide an analog low voltage depending on the phase angle of the A.C. voltage.

4. The circuit of claim 1, wherein the information includes an operating control signal for an energy converter means for controlling the load.

5. The circuit of claim 1, wherein the phase angle variation of the A.C. voltage is performed between 50 and 100% by means of a variator by phase angle cut-off.

6. The circuit of claim 1, wherein the load is a fluorescent lamp.

7. A method of transmission of information over an A.C. supply line of a supply circuit of a load having a capacitive input impedance including a receiver circuit having a capacitor adapted to provide an approximately D.C. voltage, comprising:

transmitting an A.C. voltage on an A.C. supply line;

varying the phase angle of the transmitted A.C. voltage over at most one half of a half-wave A.C. supply signal and outside charge periods of the capacitor;

receiving the A.C. supply circuit in the receiver circuit; and isolating the information in the receiver circuit relative to the phase angle upstream of the capacitor.

8. A circuit comprising:

an A.C. voltage supply circuit;

a phase angle variation circuit coupled to the A.C. voltage supply circuit, the phase angle variation circuit including a phase modification circuit for varying the phase angle of the A.C. supply during a period of one half of a half-wave;

an A.C. voltage receiving circuit coupled to receive the A.C. voltage supply circuit;

a rectifying circuit providing an output of a rectified voltage signal from the A.C. voltage supply;

a capacitor circuit coupled to the output of the rectifying circuit; and an output terminal for providing an output signal indicative of the phase angle variation in the A.C. supply voltage.

9. The circuit according to claim 8 wherein the phase modification circuit includes:

a triac;

a triac feedback path; and a feedback element in the triac feedback path for causing the triac to trip at a selected location in the phase angle of the A.C. supply voltage.

10. The circuit according to claim 9 wherein the feedback element in the feedback path includes a resistor.

11. The circuit according to claim 9 further including:

capacitor coupled to the triac circuit for determining, in coordination with the resistor of the feedback path, the phase angle of the variation in the A.C. supply voltage.

12. The circuit according to claim 8, further including a resistor bridge coupled between the rectifying circuit and the one-way conduction element.

13. The circuit according to claim 8, further including an integration circuit coupled to the voltage divider circuit to provide an analog voltage depending on the phase angle of the A.C. voltage.

14. The circuit according to claim 8 further including:

a one-way conduction element coupled prior to the capacitor such that the capacitor is charged during periods when the phase angle is not varying.

* * * * *